United States Patent [19]

Rohlfing et al.

[11] 4,331,791

[45] May 25, 1982

[54] POLYMERIZATION PROCESS USING HIGH MOLECULAR WEIGHT EPOXIDES

[75] Inventors: Raymond G. Rohlfing; Melvin B. Welch, both of Bartlesville, Okla.; Richard E. Dietz, Borger, Tex.

[73] Assignee: Phillips Petroleum Company, Bartlesville, Okla.

[21] Appl. No.: 178,279

[22] Filed: Aug. 15, 1980

[51] Int. Cl.$^3$ .......................... C08F 2/14; C08F 2/34; C08F 6/08

[52] U.S. Cl. ...................................... 526/125; 526/68; 526/70; 526/348.5; 526/352; 528/494; 528/501

[58] Field of Search ................. 528/494, 501; 526/125

[56] References Cited

U.S. PATENT DOCUMENTS

| | | | |
|---|---|---|---|
| 3,271,380 | 9/1966 | Dietz | 528/494 X |
| 3,342,794 | 9/1967 | Buchanan | 528/494 X |
| 4,065,610 | 12/1977 | De Beukelaar | 528/494 X |
| 4,117,219 | 9/1978 | Kakogawa | 528/494 |

*Primary Examiner*—C. A. Henderson

[57] ABSTRACT

Active polymerization catalyst is deactivated using a high molecular weight epoxide.

15 Claims, No Drawings

POLYMERIZATION PROCESS USING HIGH MOLECULAR WEIGHT EPOXIDES

FIELD OF THE INVENTION

The invention relates to polymerization processes. In another aspect, the invention relates to inactivating catalyst. In yet another aspect, the invention relates to olefin polymerization processes.

BACKGROUND OF THE INVENTION

Polymerization of olefins can be carried out by the solution process or by the particle form process. In both processes, the polymerization generally occurs in a polymerization zone in the presence of a suitable catalyst and a hydrocarbon diluent. After polymerization, the polymerization effluent contains polymer, either in solution form or in particle form, depending upon the process employed, and hydrocarbon diluent.

It is desirable for reasons of economy to return the hydrocarbon diluent and/or unreacted monomer(s) to the polymerization zone after separating such from the polymer product. However, difficulties are encountered. For one thing, it is generally desirable for reasons of product quality and control of the polymerization process to inactivate the residual catalyst which can be contained in the polymerization effluent. In this event, however, special precautions must be taken to prevent the catalyst inactivating agent from returning to the polymerization zone where the unactivated catalyst can have a deleterious effect on the polymerization control and can cause blocking of process lines and similar problems in downstream equipment. In the case of organometal compounds another problem encountered is that such active organometal compounds remaining in the polymer product can be pyrophoric and can ignite on exposure to oxygen. Hence, it is necessary to deactivate such organometal compounds before drying the polymer.

It is also highly desirable to deactivate the polymerization zone effluent as soon as possible after leaving the polymerization zone both to maintain even quality of the polymer and to prevent downstream problems such as those delineated above, for example, blocking of process lines and equipment and potential fire hazards. In many polymerization systems, the unreacted monomer(s) and polymerization diluents can be removed from the polymer product, for example, by flashing or vaporization, and returned to the polymerization zone. Methods known in the prior art for deactivating active catalyst residues prior to this recycle point have suffered from serious disadvantages. Typically, such catalyst deactivation steps have involved treatment with agents such as water, wet nitrogen, alcohols, low boiling epoxides, carbon dioxide, and the like. However, such agents can be carried back with the recycled monomer(s) and diluents, and can cause poisoning of the catalyst in the polymerization zone of the process. Accordingly, it is highly desirable that a catalyst deactivation process be capable of deactivating the residual active catalyst in polymerization zone effluent as soon as possible after polymerization without being returned to the polymerization zone. Another problem encountered in prior art methods for deactivating residual active catalyst in polymerization zone effluent is that if the treating compound contains active hydrogen, such as, for example, alcohols, amines, wet gases, and the like, hydrogen chloride can be liberated during the deactivation treatment causing corrosion problems with the polymerization process equipment. Accordingly, it is highly desirable that a catalyst deactivation process not liberate HCl while being at the same time capable of deactivating polymerization zone effluent as soon as possible after leaving the polymerization zone.

Further, as is known in the art, it is frequently desirable to add to the polymer product stabilizing agents for stabilizing the polymer product against such as thermal degradation, ultraviolet degradation, and the like.

OBJECTS OF THE INVENTION

An object of the invention is a method for deactivating catalyst.

A further object of the invention is a process for inactivating catalyst residues in polymerization zone effluent immediately following polymerization.

A further object is a process for inactivating catalyst residues which does not liberate HCl and which does not result in returning catalyst deactivator to the polymerization zone.

A further object of the invention is the stabilization of polymer product.

Yet other objects and advantages will be apparent to one skilled in the polymerization art from consideration of the following description and the claims.

SUMMARY OF THE INVENTION

According to the invention is a method for deactivating active catalyst comprising contacting the active catalyst with a high molecular weight epoxide.

Further according to the invention is a polymerization process comprising polymerizing in a polymerization zone at least one monomer in the presence of a polymerization catalyst to produce a polymer and catalyst mixture; and contacting said polymer and catalyst mixture in a contacting zone with a high molecular weight epoxide having more than about 12 carbon atoms.

Further according to the invention is a polymerization process comprising polymerizing in a polymerization zone at least one monomer in the presence of a polymerization catalyst to produce a polymerization zone product comprising a polymer and catalyst mixture; removing at least a portion of the polymerization zone product from the polymerization zone as a polymerization zone effluent stream; and treating the polymerization zone effluent stream as it is being removed from the polymerization zone with a high molecular weight epoxide having greater than about 12 carbon atoms in an amount effective to deactivate residual catalyst.

Further according to the invention is a polymerization process for polymerization of a monomer comprising polymerizing in a polymerization zone at least one monomer in the presence of a catalyst to produce a polymerization zone effluent stream comprising polymer, diluent, and active catalyst, and treating the polymerization zone effluent stream in a contacting zone with a high molecular weight epoxide to deactivate the polymerization catalyst and under conditions so that at least a substantial portion of the high molecular weight epoxide remains with the polymer product.

DETAILED DESCRIPTION OF THE INVENTION

As required, the invention is described by reference to preferred embodiments and with examples. The intent, however, is not thereby to limit the invention to the described embodiments and the examples, but to provide a reasonably detailed basis to enable one skilled in the art to practice the invention in any appropriate form.

According to the invention a polymerization effluent stream containing polymer, unreacted monomer(s), diluent, and active catalyst is treated with a high molecular weight epoxide to deactivate the active catalyst. The effluent stream can then be separated into its components and the unreacted monomer and diluent can be recycled to the polymerization zone. In a further aspect of the invention at least a major portion of the high molecular weight epoxide can remain with the polymer product where it can act as a stabilizing agent for the polymer.

The polymerization process employed in the practice of the present invention can be any suitable process in which the high molecular weight epoxide deactivates the catalyst system. While the invention is currently visualized as being particularly suitable for use in polymerization systems employing organometal catalyst systems, the invention in its broadest aspects is suitable for use with any catalyst system which is deactivated by the high molecular weight epoxide. Clearly, systems contemplated for use with the invention would not include for use of components, for example, diluents, monomers, or the like which can react with the epoxide, for example, such as alcohols and the like. Organometal catalyst systems have been used in accordance with the present invention with particularly good results and are thus preferred. Such organometal catalyst systems were employed in the production of polyolefin polymers.

The invention will now be discussed in more detail and especially in connection with the production of polyolefins employing the slurry or particle form process and employing organometal catalyst systems; however, it is emphasized that such description is provided for purposes of illustration and is not to be interpreted as limiting the broad invention.

While both the solution form process polymerization and particle form process polymerization can be practiced to produce polyolefins in accordance with the invention, the particle form process is preferred for reasons of economy and ease of handling of the polymerization zone product stream.

A slurry process or particle form process produces the polymer product as discrete particles suspended or entrained in a dry hydrocarbon liquid diluent, under the reaction conditions. The hydrocarbon diluent can be any suitable polymerization diluent having from 4 to about 12 carbon atoms such as, for example, isobutane, pentane, isopentane, n-butane, n-hexane, n-heptane, cyclohexane and the like.

The particle from polymerization process can be conducted batchwise in a stirred reactor or continuously employing a loop reactor. A suitable continuous process for polymerizing ethylene, for example, is known to those skilled in the art and can be such as that described in U.S. Pat. No. 3,279,087. U.S. Pat. No. 3,279,087 uses a supported chromium oxide catalyst. However, the present invention is not limited to such catalyst systems and other exemplary and preferred catalyst systems which can be employed in accordance with the invention are set out below. Suitable polymerization processes for the continuous polymerization of propylene are also known to those skilled in the art and can be, for example, such as that described in U.S. Pat. No. 3,285,899. U.S. Pat. No. 3,285,899 describes a continuous polymerization process for propylene in a loop reactor in liquid propylene and employing an organometal cocatalyst and as catalyst a compound of Groups IVB, VB, or VIII according to the Periodic Table. As indicated, other exemplary and preferred catalyst systems are set forth below.

Suitable batch processes for polymerization of olefins are also known to those skilled in the polymerization art and can be, for example, such as that disclosed in U.S. Pat. No. 3,947,433. U.S. Pat. No. 3,947,433 polymerizes ethylene in a stirred reactor employing a supported chromium oxide catalyst and in the presence of an organoboron compound and organoaluminum compound. Other batch processes known to the art can obviously also be employed in accordance with the invention.

The catalyst systems to which the invention is applicable comprise those in which the high molecular weight epoxide deactivates the catalyst system. Such catalyst system includes for example those comprising a transition metal compound or compounds of a metal or metals selected from Groups IV to VI inclusive of the Periodic Table and one or more organometal compounds, as cocatalyst, of a metal or metals selected from Groups I to III inclusive of the Periodic Table.

Suitable transition metal compounds include for example the halides, oxyhalides, alkoxides, acetylacetonates and the like, and mixtures, of titanium, zirconium, hafnium, vanadium, niobium, tantalum, chromium, molybdenum and tungsten. Compounds of titanium, zirconium, and vanadium are preferred, and compounds of titanium are particularly preferred. Such compounds can be associated with alumina, silica, magnesium chloride, manganese chloride, and the like.

Preferably, the invention is applicable to catalyst systems having at least one organometal compound having at least one metal hydrocarbyl bond because such compounds are frequently soluble and readily accessible for deactivation by high molecular weight epoxides according to the invention.

The organometal compound can be defined as a compound in which at least one hydrocarbyl radical is attached to the metal atom with any remaining metal valencies being satisfied by hydrogen or halogen atoms. Such compounds can be expressed by the formula $$R_a\text{-}MX_{(3-a)}$$

wherein

R is an alkyl, aryl, alkenyl, cycloalkyl group or combinations thereof containing from 1 to about 20 carbon atoms per molecule, M is a metal of Groups I to III inclusive of the Periodic Table (as shown, for example, in the inside front cover of Perry, *Chemical Engineer's Handbook*, 4th Edition, 1963), X is a halogen atom or hydrogen, and a is an integer in the range of 1 to 3 inclusive.

Some organometallic compounds in which the metal is selected from metals of Group I, Group II, and Group III of the Periodic Table suitable for use as the second component include, for example, lithium alkyls, Grignard reagents, dialkyl magnesium compounds, dialkyl zinc compounds, organoaluminum compounds, and the like. The organometallic compound is preferably an organoaluminum compound selected from the group consisting of trihydrocarbyl aluminum compounds of the formula $R_3Al$, organoaluminum halide compounds which include, for example, dihydrocarbylaluminum monohalides of the formula $R_2AlX$, monohydrocarbylaluminum dihalides of the formula $RAlX_2$, hydrocarbylaluminum sesquihalides of the formulas $R_3Al_2X_3$, monohydrocarbyl aluminum hydrides of the formula $RAlH_2$, and dihydrocarbylaluminum hydrides of the formula $R_2AlH$ wherein each R is as set forth above.

Some suitable organoaluminum compounds include, for example, trimethylaluminum, triethylaluminum, triisobutylaluminum, trieicosylaluminum, triphenylaluminum, ethylaluminum dihydride, di-n-butylaluminum hydride, triisopropenylaluminum, methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquichloride, ethylaluminum sesquiiodide, and the like.

In a preferred embodiment of the invention, the polymerization process is one which does not require a washing or deashing step to remove catalyst residues, liquid polymer, and the like because such a washing step is unnecessarily uneconomical and time and handling costly. Thus, preferably, the invention is employed in polymerization of ethylene polymers, which do not typically employ such a wash step, or in polymerization of higher olefins, such as propylene, 1-butene, and the like, with high activity polymerization catalysts so that no wash step is required.

According to one preferred embodiment of the invention, at least one olefinic monomer is polymerized in a polymerization zone in the presence of a polymerization catalyst to produce a slurry comprising polymer particles and dry hydrocarbon liquid (particle form process). The olefinic monomer can be selected from the group consisting of ethylene, propylene, 1-butene, 1-pentene, 1-hexene, 1-heptene, 1-octene, 1-nonene and 1-decene and mixtures. Preferably ethylene is polymerized alone or in admixture with at least one higher 1-olefin such that the product contains from about 80 to 100 mole percent ethylene.

According to a particular embodiment of the invention, the polymer slurry is contacted with the high molecular weight epoxide in a contacting zone. Preferably, the contacting zone is immediately downstream of the polymerization zone, and most preferably the high molecular weight epoxides are introduced into the transfer line connecting the polymerization zone with a separating zone or solvent removal zone, for example, such as a flash chamber having a lower pressure. The use of the transfer line and/or the separating zone as the contacting zone is currently preferred because the turbulence in the transfer line can increase as the volatile components begin to flash as the pressure decreases and such turbulence assists in assuring thorough mixing of the slurry and the high molecular weight epoxide.

The high molecular weight epoxide in accordance with the invention preferably has a vapor pressure such that most all of the epoxide will remain with the polymer product and will not be carried overhead from the separating zone. The high molecular weight epoxides according to the invention can broadly have at least one oxirane oxygen per molecule and contain from about 12 to about 100 carbon atoms per molecule or even higher so long as the epoxides are hydrocarbon soluble since hydrocarbon solvents are generally used. Preferably the high molecular weight epoxides contain two or more oxirane oxygens or active sites per molecule because epoxides prepared from readily available drying oils such as, for example, those set out below, frequently have multiple unsaturations and because more active sites mean smaller quantities of epoxide compound can be used. Thus, preferably, the high molecular weight epoxide is an epoxidized drying oil derived from at least one compound selected from the group consisting of corn oil, cottonseed oil, castor oil, dehydrated castor oil, linseed oil, safflower oil, soybean oil, tall oil, and tung oil and having from about two to about ten oxirane oxygens per molecule because the larger the number of oxirane oxygens present per molecule, the smaller amount of epoxide is required. Such oils can also contain ester oxygens which can provide additional active sites for deactivating the residual active catalyst. Most preferably, the high molecular weight epoxide is an epoxidized soybean oil, having a molecular weight of about 1000 and containing from about 6% to about 7% by weight of oxirane oxygen, that is, having on the average about 4 oxirane oxygens per molecule because such an epoxidized oil can, in addition to deactivating the catalyst residues, also act as a stabilizer of the polymer product and this material has Food and Drug Administration approval for use in polymers used in applications that contact foods.

The epoxidized drying oils which can be used according to the invention can be prepared by in situ epoxidation of the drying oil in the presence of a peroxy acid, such as for example, peroxyacetic acid, as known in the art. The epoxation procedure can be such as, for example, that described in the Encyclopedia of Polymer Science and Technology, Vol. 6, pages 94–96, John Willey and Sons, Inc., 1967.

Alternatively commercially available epoxidized drying oils such as Admex 711, available from Ashland Chemicals, Chemical Products Division, Columbus, Ohio 43216, which is an epoxidized soybeam or linseed oil, can be used.

The amount of the high molecular weight epoxy compound can broadly range from about 1 to about 10 times, or even higher, the stoichiometric amount required to react with the active catalyst present in the polymerization zone product (based, in the preferred embodiment, on the ratio of active sites in the epoxide molecule to the moles of metal-alkyl in the residual active catalyst). Thus, it is expected that one mole of an epoxide containing one oxirane oxygen per molecule can deactivate one mole, for example, of an organometal compound such as, for example, triethylaluminum. Similarly, it is expected that one mole of epoxidized drying oil, for example, epoxidized soybean oil containing on the average 4 oxirane oxygens per molecule can deactivate 4 moles of an organometal compound such as, for example, triethylaluminum.

The contacting temperature employed in the contacting zone for contacting the high molecular weight epoxide and the polymerization zone product can broadly range from about 25° C. to about 5° C. below the melting point of the polymer in the particle form process because this range includes the temperatures found in most commercial polymerization processes. More preferably, the contacting temperature can range between about 60° C. and about 120° C. because this range includes temperatures commonly encountered in the polymerization in particle form process of the lower mono-1-olefins such as ethylene, propylene, and the like.

The contacting time is a time effective for deactivation of at least a major portion of the residual catalyst. Since the reaction occurs virtually instantaneously upon contacting the contacting time can broadly range from less than about 1 second to about 10 minutes or longer, although of course even longer or shorter periods of time can also be used when adequate contacting is achieved. Times in the lower end of this range are effective for deactivation of a major portion of the residual catalyst while times in the upper end of the range are effective for deactivation of substantially all residuals catalyst.

As indicated, the contacting time is not considered critical and can range over a broad period of time so long as good contacting of the high molecular weight epoxide with the polymerization zone effluent is achieved. Preferably good contacting can be achieved by contacting the high molecular weigth epoxide in a zone of turbulence. In a preferred embodiment, the zone of turbulence is a transfer line connecting the polymerization zone with downstream equipment.

The high molecular weight epoxides according to the invention can be introduced into the contacting zone in a suitable solvent such as n-hexane, isobutane, cyclohexane, and other hydrocarbon diluents, and the like. Preferably the solvent is the same as the polymerization hydrocarbon diluents, such as, for example, those set out above for ease of handling and economy.

After treating the polymerization zone product with the high molecular weight epoxide according to the invention, the polymer product can be separated from the diluent in a separating zone, for example, by flashing in a low pressure zone or by other means such as are known in the art to produce a polymer product stream containing polymer product and a recycle stream containing predominantly unreacted monomer(s) and polymerization diluent.

The polymer product will contain a substantial portion of the high molecular weight epoxide because the high boiling point of the epoxide will cause the epoxide to remain with the polymer product. Typically it is expected that at least 80 percent by weight of the epoxide will remain associated with the polymer product where the epoxide can act, for example, as a stabilizing agent or a plasticizing agent or the like. Preferably, substantially all, or more than about 99 percent, of the high molecular weight epoxide will remain associated with the polymer product.

The recycle stream from the separating zone containing predominantly unreacted monomer and diluent can be returned directly to the polymerization zone or, in the event that the diluent stream from the separating zone contains more than about 1 percent by weight of the high molecular weight epoxide, which is currently considered unacceptably deleterious to the polymerization, the diluent stream can be further treated, for example, by distillation. Virtually all of the high molecular weight epoxides will then remain in the kettle bottoms or the like and can be easily separated from the diluent stream and will not be returned to the polymerization zone.

The polymer product stream can be further treated downstream of the separating zone by other catalyst deactivating agents to deactivate any residual active catalyst which may remain. Thus, for example, the polymer product stream can be treated with $CO_2$, water, wet nitrogen, alcohols, and such as are known in the art since these agents can be easily removed from the polymer without contamination of recycle streams. The invention is particularly advantageous in providing a catalyst deactivating system suitable for use prior to treatment in the separating zone thereby avoiding significant problems encountered with other catalyst deactivation systems when used at this stage in the polymerization production process.

To further illustrate the invention, the following example is provided.

EXAMPLE

Ethylene polymerization was conducted in a liquid full 42.8 liters (11.3 U.S. gallon) loop reactor containing isobutane as diluent for 1 hour after establishing equilibrium, at a nominal reactor pressure of 4.10 MPa (595 psia) and a nominal reactor temperature of about 100° C. (specific temperatures are set forth in Table I below). Effluent was intermittently discharged from the reactor and passed to a flash chamber where the polymer was recovered, dried, and sieved. Diluent was intermittently introduced into the reactor along with a dilute solution of triethylaluminum in n-hexane, for example, 0.5 weight percent in n-hexane, and intermittent addition of catalyst sufficient to maintain the production rate. Hydrogen was used as a molecular weight modifier for the polymer. Circulation in the reactor was accomplished by means of an agitator operating at 1850 RPM.

The Ti-Mg catalyst having prepolymer was prepared as follows:

To a clean, dry, nitrogen flushed Pfaudler reactor of about 30 gallon (114 L) capacity was added about 8 gallon (30 L) of dried and deoxygenated mixed xylols, 1136.8 g (11.9 moles) of dried, $MgCl_2$, sieved through a 50 mesh screen (U.S. Sieve Series) and 12 pounds (23.9 moles) of titanium tetraethoxide $[Ti(OC_2H_5)_4]$. While stirring, the mixture was heated to 100° C., held there for 30 minutes and the mixture was cooled to 30° C. The reactor was purged with ethylene gas and the ethylene pressure maintained at 10 psia (69 kPa). In a 45 minute period, while holding the temperature at 30° C.±2° C., there was added 24.0 pounds (11.1 moles) of ethylaluminumsesquichloride (EASC) solution as 25 weight percent EASC dissoled in n-heptane to the stirred mixture. Stirring was continued for 30 minutes after the addition. Stirring was then discontinued, the mixture was allowed to settle, and the liquid above the slurry was decanted. The slurry was washed with about a 15 gallon (57 L) portion of n-hexane by mixing, settling, and decanting. Then about 10 gallon (38 L) of fresh n-hexane was mixed with the slurry and the slurry allowed to settle overnight.

The next morning the surplus wash liquid was removed by decanting and about 10 gallons of fresh n-hexane was added to the slurry. The reactor was then flushed with ethylene gas and left under 65 psia (448 kPa) ethylene while 0.4 pound (0.2 mole) of the EASC solution was slowly added to the stirred solution. The temperature was maintained at 20°–30° C. during the addition (about 10 minutes) and during an ensuring 1 hour period. Stirring was discontinued, the slurry allowed to settle, and it was washed twice with about 10 gallon portions of n-hexane per wash as before. Following the second decanting of liquid, about 10 more gallons of fresh n-hexane was added to the slurry and to the stirred mixture was added 14.0 pounds (33.5 moles) of TiCl$_4$. The mixture was stirred for 1 hour at 28°–30° C., stirring was discontinued and the solids allowed to settle. The resulting product (slurry) was washed 4 times as before with about 10 gallons (38 L) of n-hexane per wash.

The final washed slurry mounting to 30.0 pounds (13.6 kg) was transferred to a receiver for storage until further use. Subsequent analyses showed that the slurry contained 3.80 pounds (1.72 kg) of catalyst on a dry basis, the catalyst contained 7.0 weight percent polyethylene (prepolymer), and the Ti content of the catalyst was 11.6 weight percent. The catalyst thus prepared was used in Run 2.

The catalyst of Run 1 was prepared in a generally similar method to that of the above catalyst in the Pfaudler reactor at similar times and temperatures. However, in this run the reactor was charged with about 19 gallons (72 L) of n-hexene, 1179.1 g (12.4 moles) of dry sieved MgCl$_2$ and 12 pounds (23.9 moles) of Ti(OC$_2$H$_5$)$_4$. The amount of EASC solution employed in the first addition was 26.0 pounds (12.1 moles) and 1.0 pound (0.50 mole) in the second addition.

The final washed slurry amounting to 65.8 pounds (29.8 kg) was transferred to a receiver for storage until further use. Subsequent analyses revealed that the slurry contained 8.3 pounds (3.8 kg) of catalyst on a dry basis, the Ti content of the catalyst was 12.2 weight percent and the amount of prepolymer on the catalyst was 7.0 weight percent. The catalyst thus prepared was used in run 1.

Polymerization was conducted as follows:

A continuous particle form process was conducted using isobutane as diluent, triethylaluminum as cocatalyst, hydrogen as a modifier and the above catalyst added in increments at the rate of about 0.12 g/hour. The pressure was 4.1 MPa, the production rate at a calculated 30 weight percent solids in the reactor was about 16 lbs. polymer per hour and the average residence time was 1 hour. The reactor effluent was intermittently discharged at about 28 liters/hour through a pressure takeoff valve into a 1.9 cm diameter stainless steel pipe about 3.1 meters long which emptied into a flash chamber operated at about 80° C. and a pressure of about 135 kPa. A solution containing 4.26 weight percent epoxidized soybean oil dissolved in nhexane was injected into the reactor slurry just after it was discharged from the reactor. The length of contact time between slurry and epoxidized oil in the pipe (transfer line) and flash chamber was calculated to be about 1 minute.

The conditions employed and results obtained are given in Table I.

TABLE I

| Production of Ethylene Polymers | | |
|---|---|---|
| Run No. | 1 | 2 |
| Polymer made | homopolymer | ethylene/1-hexene copolymer |
| Polymer melt index, g/10 min[1] | 31 | 2.4 |
| Polymer density, g/cc | 0.9643 | 0.9456 |
| Polymer bulk density, g/cc | 0.440 | 0.439 |
| Prepolymer in catalyst, wt % | 7.0 | 7.0 |
| Cocatalyst, ppm[2] | 19.5 | 22.5 |
| Ethylene in reactor, mole % | 6.1 | 5.5 |
| Hydrogen in reactor, mole % | 0.70 | 0.31 |
| Hydrogen/ethylene mole ratio | 0.114 | 0.055 |
| Hexene-1 used, wt % of ethylene | 0 | 10.64 |
| Reactor temp., °C. | 101.5 | 96.3 |
| Epoxidized soybean oil × stoicmetric) | 4.1 | 3.7 |

[1]ASTM D 1238-65 T, Condition E
[2]Based on isobutane feed to reactor

The conditions employed and the results obtained are typical of the reactor with the catalysts used.

Periodic analyses of the recycle isobutane recovered from the flash chamber indicated that it was free of epoxidized soybean oil. The epoxidized oil was found to effectively deactivate unreacted catalyst contained in the reactor slurry.

Several advantages result from employing the high molecular weight epoxides according to the invention, particularly the epoxidized drying oils, for example, epoxidized soybean oil. The relatively high molecular weight material has a high boiling point which means most of the unreacted surplus will generally remain with the isolated polymer where it can act as a stabilizing agent. Any entrained in the flash gases which are recovered and recycled will remain in the kettle bottom product during recovery of the diluent by distillation when such is employed. Consequently, recycle streams will be free of epoxide and inadvertent poisoning of the catalyst will not occur as is possible with low molecular weight epoxides such as, for example, propylene oxide. Further, as indicated, the invention provides a catalyst deactivating system which can be used virtually immediately as the polymerization zone effluent leaves the polymerization zone which can avoid many of the problems which can be encountered with other catalyst deactivations systems when used at this point, such as poisoning of catalyst in the polymerization zone, blockage of downstream equipment, and the like.

That which is claimed is:

1. A polymerization process comprising:
   polymerizing in a polymerization zone at least one olefinic monomer in the presence of a polymerization catalyst and diluent to produce a polymerization zone product comprising a mixture of diluent, polymer, monomer and residual polymerization catalyst;
   removing at least a portion of the polymerization zone product from the polymerization zone as a polymerization zone effluent stream;
   treating the polymerization zone effluent stream as it is being removed from the polymerization zone and conveyed to a flash zone with a high molecular weight epoxide having greater than about 12 carbon atoms in an amount effective to deactivate residual catalyst; then
   flashing the polymerization zone effluent stream in the flash zone to produce a polymer product stream comprising polymer and substantially all of the high molecular weight epoxide and a recycle stream containing predominantly unreacted monomer and diluent.

2. A polymerization process as in claim 1 wherein:
   the high molecular weight epoxide has at least one oxirane oxygen per molecule and contains from about 12 to about 100 carbon atoms per molecule.

3. A polymerization process as in claim 1 wherein:
the high molecular weight epoxide has at least 2 oxirane oxygens per molecule and contains from about 12 to about 100 carbon atoms per molecule.

4. A polymerization process as in claim 1 wherein:
the high molecular weight epoxide is an epoxidized drying oil derived from at least one compound selected from the group of corn oil, cottonseed oil, dehydrated caster oil, linseed oil, safflower oil, soybean oil, tall oil and tung oil and having from about two to about 10 oxirane oxygens per molecule.

5. A polymerization process as in claim 1 wherein:
the high molecular weight epoxide is an epoxidized soybean oil, having a molecular weight of about 1000, and containing from about 6% to about 7% by weight of oxirane oxygen, that is, having on the average about 4 oxirane oxygens per molecule.

6. A polymerization process as in claim 1 wherein:
the polymerization process comprises the polymerization of at least one olefinic monomer;
the at least one olefinic monomer is selected from the group consisting of ethylene, propylene, 1-butene, 1-pentene, 1-hexene, 1-heptene, 1-octene, 1-nonene, and 1-decene;
the polymerization process is a particle form process producing a slurry comprising polymer particles, hydrocarbon liquid, and catalyst; and
no washing step is employed for removal of catalyst residues.

7. A polymerization process as in claim 6 wherein:
the at least one olefinic monomer is ethylene.

8. A polymerization process as in claim 6 wherein:
the at least one olefinic monomer is propylene; and
the polymerization catalyst is a high activity catalyst so that no washing of the polymer to remove catalyst residues is employed.

9. A polymerization process as in claim 6 further comprising:
returning the recycle stream to the polymerization zone.

10. A polymerization process as in claim 6 wherein:
the contacting with epoxide is at a contacting temperature in the range of about 25° C. to about 5° C. below the melting point of the polymer.

11. A polymerization process as in claim 10 wherein:
the contacting temperature is in the range of about 60° C. to about 120° C.

12. A polymerization process as in claim 1 wherein:
the catalyst has at least one compound having at least one metal alkyl bond; and
the amount of epoxide is in the range of about 1 to about 10 times the stoichiometric amount required for deactivation of the catalyst based on the ratio of active sites of the moles of metal alkyl in the catalyst.

13. A polymerization process as in claim 1 wherein:
the catalyst comprises at least one compound having at least one metal alkyl bond.

14. A polymerization process as in claim 13 wherein:
said at least one compound having at least one metal alkyl bond is selected from the group consisting of compounds expressed by the formula $$R_a\text{-}MX_{(3-a)}$$

wherein
R is an alkyl, aryl, alkenyl, cycloalkyl, group or combinations thereof,
M is a metal of groups I to III inclusive of the Periodic Table according to Mendeleev,
X is a halogen atom or hydrogen, and
a is an integer in the range of 1 to 3.

15. A polymerization process as in claim 14 wherein:
said at least one compound is an organoaluminum compound.

* * * * *

UNITED STATES PATENT AND TRADEMARK OFFICE
CERTIFICATE OF CORRECTION

PATENT NO. : 4,331,791
DATED : May 25, 1982
INVENTOR(S) : Raymond G. Rohlfing et al.

It is certified that error appears in the above-identified patent and that said Letters Patent are hereby corrected as shown below:

Column 12, claim 12, line 18, after "of the" and before "mole of" insert -- epoxide to --.

Signed and Sealed this

Ninth Day of November 1982

[SEAL]

Attest:

GERALD J. MOSSINGHOFF

Attesting Officer       Commissioner of Patents and Trademarks